United States Patent
Newman et al.

(10) Patent No.: US 12,165,516 B2
(45) Date of Patent: *Dec. 10, 2024

(54) TRAFFIC COLLISON AVOIDANCE OR MINIMIZATION BY SUPERCOMPUTER ASSIST IN 5G/6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,736

(22) Filed: Oct. 25, 2023

(65) Prior Publication Data

US 2024/0054899 A1    Feb. 15, 2024

Related U.S. Application Data

(63) Continuation of application No. 17/991,051, filed on Nov. 21, 2022, now Pat. No. 11,837,096, which is a
(Continued)

(51) Int. Cl.
*G08G 1/16* (2006.01)
*B60W 10/04* (2006.01)
(Continued)

(52) U.S. Cl.
CPC ............ *G08G 1/164* (2013.01); *B60W 10/04* (2013.01); *B60W 10/18* (2013.01); *B60W 10/20* (2013.01);
(Continued)

(58) Field of Classification Search
CPC ....... G08G 1/164; G08G 1/166; B60W 10/04; B60W 10/18; B60W 10/20; B60W 30/08;
(Continued)

(56) References Cited

U.S. PATENT DOCUMENTS

| | | | | | |
|---|---|---|---|---|---|
| 3,466,409 | A | * | 9/1969 | Pernet | H01H 35/14 200/61.45 R |
| 3,882,449 | A | * | 5/1975 | Bouchard | H01H 35/14 340/471 |

(Continued)

*Primary Examiner* — Richard M Camby

(57) ABSTRACT

Traffic collisions involving autonomous vehicles can be greatly reduced by timely initiation of evasive action. However, calculating a suitable sequence of actions capable of avoiding or minimizing the collision may require the speed of a supercomputer. Therefore, disclosed is a method for the autonomous vehicle to transmit an emergency message with sensor data to a nearby access point in 5G or 6G, and the access point can forward the data to a supercomputer trained in collision avoidance. The supercomputer, millions or billions of times faster than vehicle computers, explores many sequences of actions and selects the one most likely to avoid the collision or if unavoidable, the sequence of actions that results in the least harm. Again using an exclusive channel, the supercomputer and the access point can relay the selected sequence to the autonomous vehicle, for immediate collision avoidance or harm minimization.

20 Claims, 5 Drawing Sheets

Related U.S. Application Data continuation of application No. 17/738,424, filed on May 6, 2022, now Pat. No. 11,514,792, which is a continuation of application No. 17/485,740, filed on Sep. 27, 2021, now abandoned, which is a continuation of application No. 17/176,451, filed on Feb. 16, 2021, now abandoned, which is a continuation of application No. 16/920,967, filed on Jul. 6, 2020, now abandoned, which is a continuation of application No. 16/503,020, filed on Jul. 3, 2019, now Pat. No. 10,713,950.

(60) Provisional application No. 62/861,055, filed on Jun. 13, 2019.

(51) Int. Cl.
| | |
|---|---|
| *B60W 10/18* | (2012.01) |
| *B60W 10/20* | (2006.01) |
| *B60W 30/08* | (2012.01) |
| *B60W 30/09* | (2012.01) |
| *G06Q 50/26* | (2012.01) |
| *H04W 4/44* | (2018.01) |
| *H04L 67/1097* | (2022.01) |
| *H04W 84/04* | (2009.01) |

(52) U.S. Cl.
CPC ............ *B60W 30/08* (2013.01); *B60W 30/09* (2013.01); *G06Q 50/265* (2013.01); *G08G 1/166* (2013.01); *H04W 4/44* (2018.02); *B60W 2400/00* (2013.01); *B60W 2556/50* (2020.02); *B60W 2710/18* (2013.01); *B60W 2710/20* (2013.01); *B60W 2720/106* (2013.01); *H04L 67/1097* (2013.01); *H04W 84/042* (2013.01)

(58) Field of Classification Search
CPC ............ B60W 30/09; B60W 2400/00; B60W 2556/50; B60W 2710/18; B60W 2710/20; B60W 2720/106; G06Q 50/265; H04W 4/44; H04W 84/042; H04W 4/029; H04W 4/90; H04L 67/1097; H04L 67/563; H04L 69/04; H04L 69/22
See application file for complete search history.

(56) References Cited

U.S. PATENT DOCUMENTS

| | | | |
|---|---|---|---|
| 2018/0127000 A1* | 5/2018 | Jiang | G05D 1/0088 |
| 2018/0292829 A1* | 10/2018 | Li | G06Q 10/02 |
| 2018/0299898 A1* | 10/2018 | Luo | B60W 30/143 |

* cited by examiner

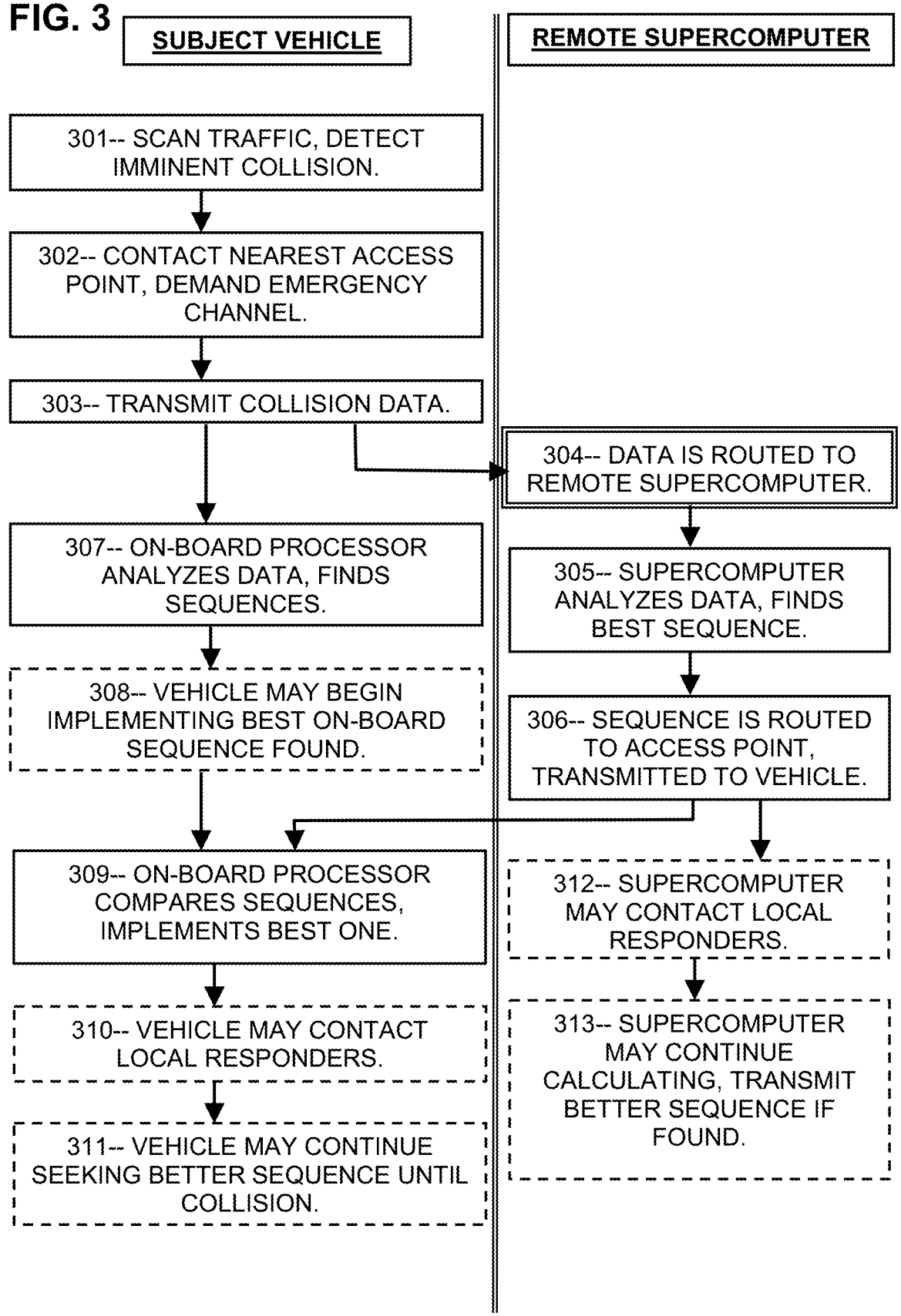

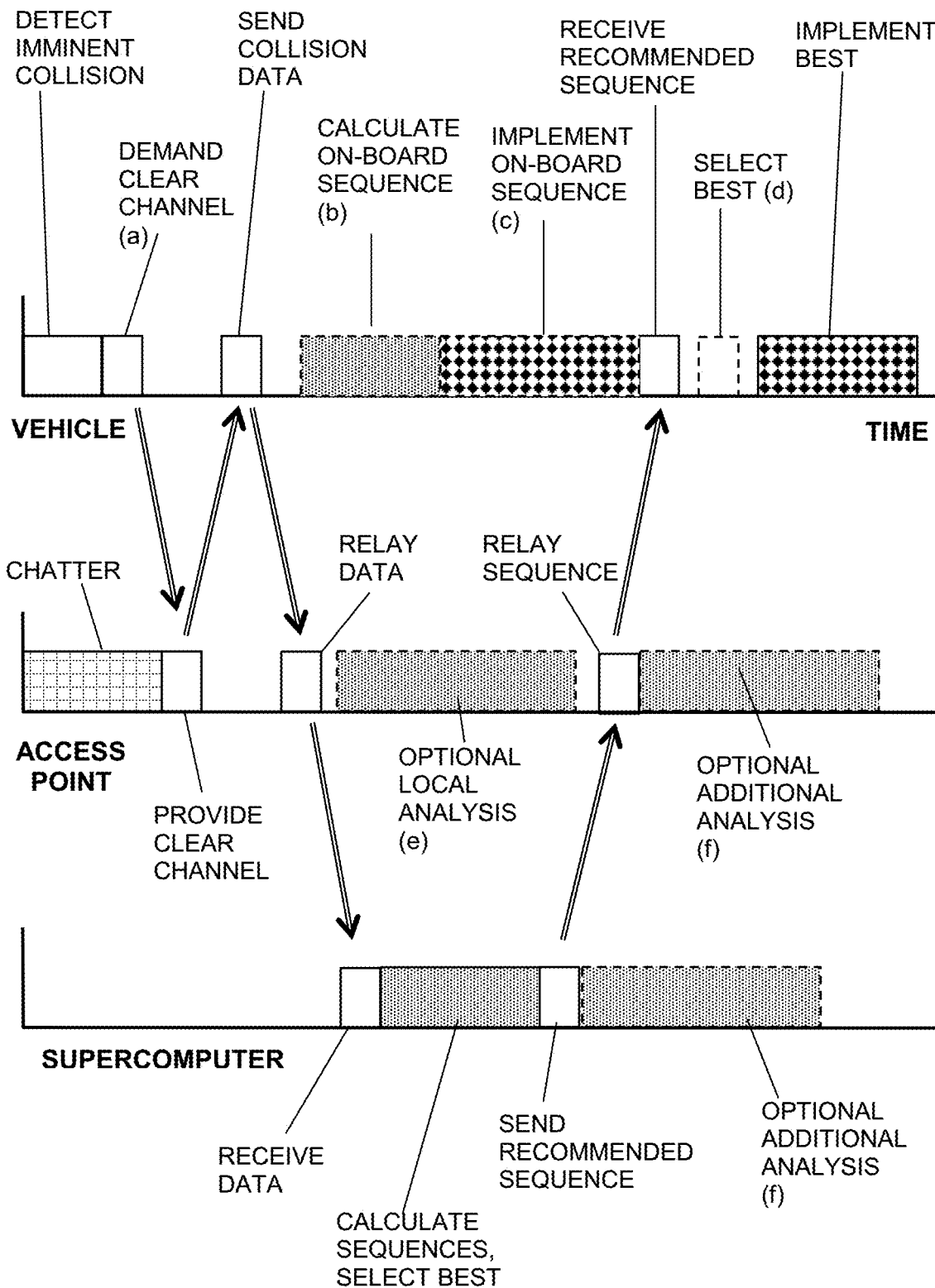

TRAFFIC COLLISON AVOIDANCE OR MINIMIZATION BY SUPERCOMPUTER ASSIST IN 5G/6G

CROSS REFERENCE TO RELATED APPLICATION

This application is a continuation of U.S. patent application Ser. No. 17/991,051, entitled "Method for a Supercomputer to Mitigate Traffic Collisions with 5G or 6G", filed Nov. 21, 2022, which is a continuation of U.S. patent application Ser. No. 17/738,424, entitled "Multi-Computer Communication in 5G/6G for Traffic Safety", filed May 6, 2022, which is a continuation of U.S. patent application Ser. No. 17/485,740, entitled "Rapid Wireless Communication for Vehicle Collision Mitigation", filed Sep. 27, 2021, which is a continuation of U.S. patent application Ser. No. 17/176,451, entitled "Rapid Wireless Communication for Vehicle Collision Mitigation", filed Feb. 16, 2021, which is a continuation of U.S. patent application Ser. No. 16/920,967, entitled "Rapid Wireless Communication for Vehicle Collision Mitigation", filed Jul. 6, 2020, which is a continuation of U.S. patent application Ser. No. 16/503,020, entitled "Rapid Wireless Communication for Vehicle Collision Mitigation", filed Jul. 3, 2019, which claims the benefit of U.S. Provisional Application Ser. No. 62/861,055, filed Jun. 13, 2019 entitled "Rapid Wireless Communication for Vehicle Collision Mitigation", the contents of which are incorporated herein by reference in entirety. This application is also related to U.S. Pat. No. 9,896,096, issued Feb. 20, 2018 entitled "SYSTEMS AND METHODS FOR HAZARD MITIGATION" and U.S. patent application Ser. No. 16/148,390, filed Oct. 1, 2018 entitled "Blind Spot Potential-Hazard Avoidance System" and U.S. patent application Ser. No. 16/390,219, filed Mar. 22, 2019 entitled "Autonomous Vehicle Localization System", the contents of which are incorporated herein by reference in their entireties.

FIELD OF THE INVENTION

The invention relates to systems and methods for mitigating vehicle collisions, and more particularly for use of rapid wireless communication technology and supercomputers to avoid collisions, and to minimize the harm of collisions when unavoidable.

BACKGROUND OF THE INVENTION

Most traffic collisions could be avoided if definitive action is taken quickly enough, while harm from those collisions that are truly unavoidable could be minimized by actively managing the interaction in real-time. However, at freeway speeds, human reflexes are not fast enough and human judgment not sufficient. Instead, electronic reflexes and speed-of-light signal propagation are needed to enable a wide range of collision mitigation options. A suitable collision-avoidance or harm-minimization action must be planned and controlled. Typically thousands or millions of possible actions must be analyzed and compared, depending on the parameters of each particular collision scenario. A supercomputer would be needed to rapidly evaluate the imminent collision, review prior mitigation attempts, create new plans tailored to the current emergency, select the best option, and begin implementing it, all of which must be performed before the vehicles actually collide. Since vehicles generally do not have supercomputers on-board, it is not possible to find the best avoidance strategy in a brief time-to-collision, leading to many unnecessary collisions and thousands of fatalities.

What is needed is means for a vehicle, facing an imminent collision, to obtain the most effective collision-mitigation strategy, quickly enough for it to be implemented.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for an autonomous vehicle to mitigate an imminent collision, the method comprising: determining that a collision with a second vehicle is imminent; transmitting, to an access point, a request message requesting assistance in mitigating the imminent collision; calculating, using a processor in the autonomous vehicle, a first plurality of sequences of actions, and determining whether each of the sequences of actions of the first plurality can avoid the imminent collision; upon determining that a particular sequence of actions of the first plurality can avoid the imminent collision, implementing the particular sequence of actions; and while none of the sequences of actions of the first plurality can avoid the imminent collision, selecting a selected sequence of actions of the first plurality that can produce a least amount of harm, and implementing the selected sequence of actions.

In a second aspect, there is a method for an access point to enable an autonomous vehicle to mitigate an imminent collision, the method comprising: receiving a request message from an autonomous vehicle, the request message requesting assistance in mitigating an imminent collision; receiving, in or with the request message, or in a subsequent message, data about the imminent collision; transmitting, to a supercomputer, the data about the imminent collision; calculating, using a processor in the access point or associated with the access point, a first plurality of sequences of actions; and determining, according to the data about the imminent collision, whether any of the sequences of actions of the first plurality can avoid the imminent collision, and if so, selecting, as a selected sequence of actions, the sequence of actions of the first plurality that can avoid the imminent collision.

In a third aspect, there is A method for a supercomputer to enable an autonomous vehicle to mitigate an imminent collision, the method comprising: using an artificial intelligence structure comprising a processor and a memory containing an artificial intelligence model; receiving, from an access point, data about an imminent collision involving an autonomous vehicle; providing, as input to the artificial intelligence model, the data about the imminent collision; determining, as output from the artificial intelligence model, zero or more sequences of actions that can enable the autonomous vehicle to avoid the imminent collision; when at least one of the sequences of actions can enable the autonomous vehicle to avoid the imminent collision, selecting one of the at least one sequences of actions; when none of the sequences of actions can enable the autonomous vehicle to avoid the imminent collision, selecting a sequence of actions that is expected to cause a least amount of harm; and transmitting, to the access point, the selected sequence of actions.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 3 is a flowchart showing an exemplary method for mitigating collisions with assistance of a supercomputer, according to some embodiments.

FIG. 4 is a time-sequence chart showing assistance by an exemplary supercomputer, according to some embodiments.

DETAILED DESCRIPTION

Figure 1:
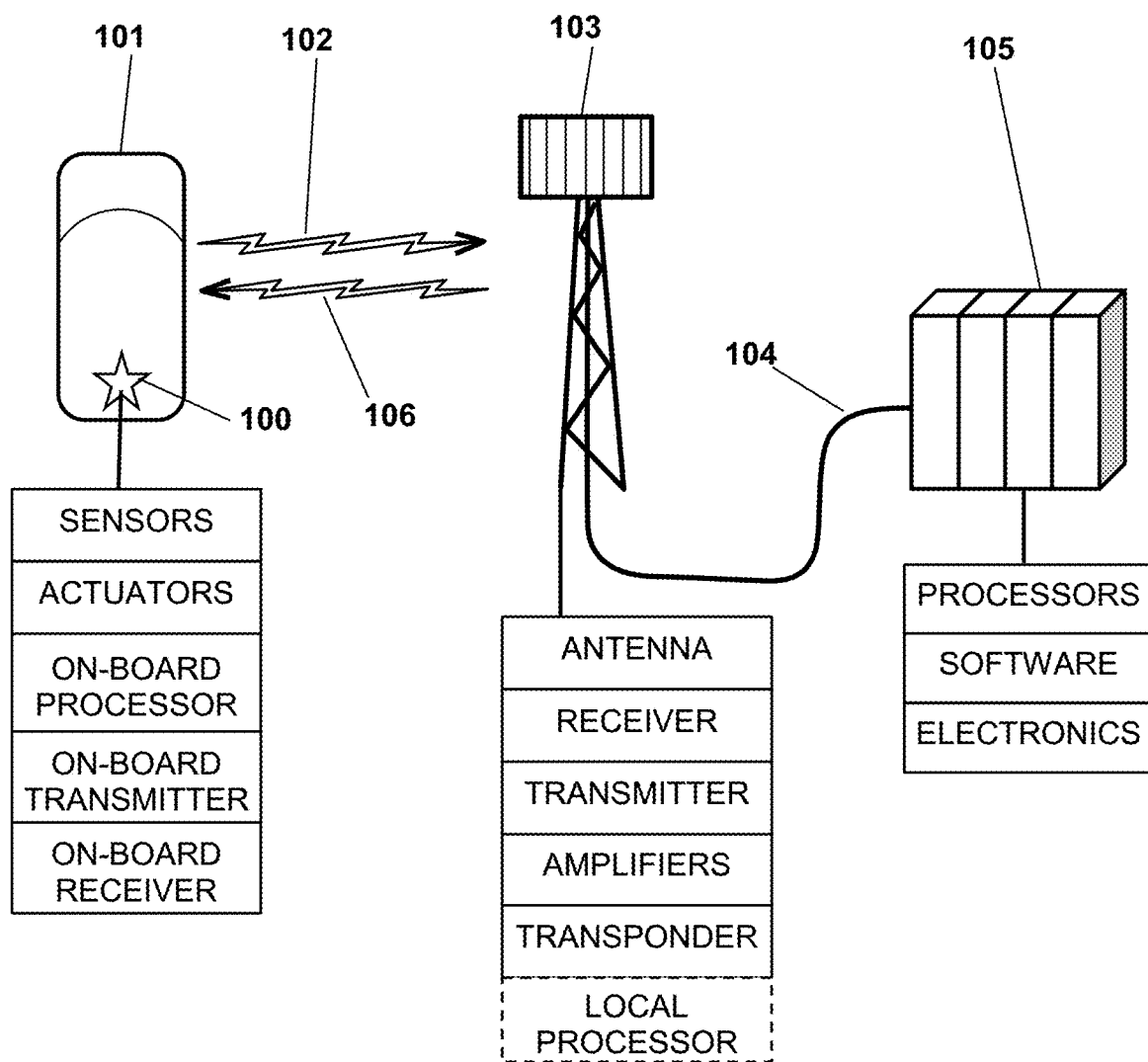
FIG. 1 is a schematic indicating parts of an exemplary system for mitigating collisions with assistance of a supercomputer, according to some embodiments.

Systems and methods are disclosed that enable autonomous or semi-autonomous vehicles to avoid or minimize imminent collisions, with assistance from a land-based computer or a remote supercomputer, using fast communication technology such as 5G or higher. Embodiments of a "collision-mitigation system" according to present principles may include a "subject" vehicle configured to transmit and receive wireless messages, a computer or supercomputer configured to perform collision mitigation calculations, and high-speed communication technology configured to relay messages between the subject vehicle and the computer or supercomputer. The subject vehicle may be configured to detect the imminent collision and to transmit data about the imminent collision, using the high-speed communication technology, to a land-based access point such as a 5G base station, which may then relay the data to a land-based computer or a remote supercomputer. The computer or supercomputer may be configured to calculate a sequence of actions for mitigating the imminent collision, and to communicate the sequence back to the subject vehicle via the land-based access point or base station. The subject vehicle may be configured to implement the sequence of actions by causing steering, accelerating, and/or braking actions according to the sequence, thereby mitigating the imminent collision.

As used herein, a "collision" is physical contact between the subject vehicle and another vehicle or another object. An "imminent" collision is a collision which is projected to occur within a short time interval if no evasive actions are taken by the subject vehicle, the short time interval being 1 second or 5 seconds or 10 seconds for example. "Mitigating" an imminent collision means avoiding the collision if avoidable and minimizing the harm of the collision if unavoidable. "Harm" is a calculated total negative effect, which may include estimates for loss of life, bodily injury, and property damage, wherein each estimate may be multiplied by a respective predetermined weighting factor and optionally by a probability factor. The probability factor may be replaced by a full probability analysis, e.g., using Bayesian inference, with total harm as an output and the probability of such harm as a multiplier. Logistic regression or like machine learning may be employed to personalize the expected effects to a user, e.g., to take into account typical user responses, to the extent the autonomous vehicle has some human input. A vehicle is "autonomous" when it is operated entirely or primarily by an on-board processor with no, or at most occasional, input from a human. A vehicle is "semi-autonomous" if it is operated with inputs from both a human and a processor, such as a speed-control system, an automatic-braking system, a lane-keeping system, and the like. A vehicle with an automatic emergency intervention system, of the type that operates the vehicle temporarily in an emergency and then returns control to a human, is considered autonomous during the time that the processor is in control. The subject vehicle may be autonomous or semi-autonomous. A "second" vehicle is another vehicle (or sometimes another object) with which an imminent collision with the subject vehicle is projected to occur. A computer or transmitter or receiver is "land-based" if it is not on-board the subject vehicle. A computer is a "supercomputer" if the computer is capable of performing many more calculations per second than commonly available computers; examples are provided below. "5G" means fifth generation cellular network technology that provides broadband access. "Latency" in communications means the time between transmission and reception of a message. A "sequence of actions" is a series of instructions for mitigating the collision, in which each instruction specifies an action such as an acceleration, braking, or steering of the subject vehicle, or a waiting interval, or other action that the subject vehicle can implement. The sequence may include an intensity and/or a time period for each action, such as "brake at 5 m/s$^2$ for 2 seconds". The sequence may include conditionals or branches, such as "steer left until clear of the second vehicle, then steer right until traveling parallel to the lane". The actions may include non-kinetic actions such as "sound the horn and illuminate the brake lights" or "send a help-request message to emergency responders", according to some embodiments. The "cloud" is a network of servers configured to provide online services such as data storage and/or computation, generally transparently to the user. If the collision is avoidable, the "best" sequence is the particular sequence that avoids the collision with the highest probability or lowest acceleration or other criterion. On the other hand, if the collision is unavoidable, the best sequence is the particular sequence that results in the least harm. A collision is "avoidable" if any of the sequences can avoid it, and "unavoidable" otherwise. An imminent collision may be judged unavoidable initially, and then may become avoidable if a suitable sequence is subsequently discovered. Alternatively, an imminent collision that initially appears to be avoidable may become unavoidable if the avoidance strategy does not go well, e.g., if unpredicted unforeseeable intervening events occur.

Embodiments of the collision-mitigation system may include an on-board processor and an on-board wireless transmitter and an on-board wireless receiver (which may be configured as a transceiver) on the subject vehicle. The on-board processor may be configured to detect an imminent collision and to transmit data about the imminent collision to the supercomputer using, for example, wireless technology. For example, the wireless technology may include high-speed minimal-latency mobile network technology such as 4G or 5G or higher, or a dedicated (non-network) emergency response communication technology, or other wireless means for sending and receiving messages. The on-board processor (or other processor) may request or demand maximum-speed communication such as an unshared data transfer link with minimal latency for the emergency response. The subject vehicle may communicate wirelessly with a land-based access point (such as a cellular tower or a 5G base station or the like) which may include a land-based receiver, a land-based transmitter, a land-based processor, and other electronics for wirelessly communicating with the subject vehicle and for transferring data to the computer. The computer (such as a land-based computer or a remote supercomputer or a plurality of networked servers in the "cloud") may be configured to analyze the imminent collision data, calculate a sequence of actions to mitigate the collision, and transmit the recommended sequence back to the subject vehicle, generally using a land-based access point as a relay station. The subject vehicle may be configured to receive the recommended sequence and implement it by actuating the brakes, accelerator, and steering of the subject vehicle as specified in the recommended sequence.

In some embodiments, the on-board processor may be configured to calculate a local or on-board sequence of actions (independently of the supercomputer) by analyzing the imminent collision data after transmitting the imminent collision data in the wireless request message (that is, at the same time that the supercomputer is also working). After receiving the recommended sequence from the supercomputer, the on-board processor may be configured to compare the on-board sequence and the recommended sequences (that is, compare the best sequences found by the on-board processor and by the supercomputer). The on-board processor may be configured to select the best one of those sequences, and may implement the selected sequence. Alternatively, or in addition, the on-board processor may begin implementing its favored on-board sequence when found, even before receiving the recommended sequence from the supercomputer. In that case, the on-board processor may subsequently compare the two favored sequences and may switch to the sequence recommended by the supercomputer if it is better than the currently implemented sequence. Alternatively, or in addition, the land-based access point may include a local processor configured to calculate mitigation sequences and transmit a "local" sequence to the subject vehicle, in parallel with the remote computer, in which case the on-board processor can select whichever of the on-board sequence and the local sequence provides the best mitigation.

Turning now to the figures, FIG. 1 is a schematic illustration of an exemplary collision-mitigation system according to the present disclosure. Embodiments of the system may include a subject vehicle 101, wireless signals including a wireless request message 102 and a wireless response message 106, a land-based access point 103 including an antenna for the wireless signals 102 and 106, data transfer means 104 such as an electrical or fiber-optic cable or a microwave link or other communication means, and a computer or supercomputer 105. The subject vehicle 101 may include an autonomous control system 100 (depicted as a star) including sensors, actuators, an on-board processor, an on-board transmitter, and an on-board receiver. The autonomous control system 100 may be configured to send the wireless request message 102 upon detecting an imminent collision. The wireless request message 102 may include a request for emergency computational assistance and/or a request for an uncontested direct communication channel to the supercomputer 105 via the land-based access point 103. The wireless request message 102 may further include data about the imminent collision, or alternatively the imminent collision data may be provided in a second transmission after receiving an acknowledgement from the land-based access point 103. In the following examples, the imminent collision data is assumed to be included in the initial wireless request message 102, unless otherwise indicated.

The land-based access point 103 may include an antenna, a land-based receiver, and a land-based transmitter configured to communicate with the subject vehicle 101, additional electronics such as amplifiers etc., a transponder configured to transmit the imminent collision data to the supercomputer 105 via the data transfer means 104, and to receive the recommended sequence via the data transfer means 104. The land-based access point 103 may optionally (shown in dash) include a local processor or computer configured to analyze traffic data and select suitable sequences to mitigate potential traffic hazards. The land-based access point 103 may transfer the imminent collision data to the supercomputer 105 for processing. To save time, the land-based access point 103 may begin relaying the data while still receiving the wireless request message 102, instead of waiting until the wireless request message 102 has completed.

The remote computer or supercomputer 105 may include one or more (usually many thousands) of processors, software or firmware suitable for calculating sequences to mitigate collisions, and electronics to interface with the data communication means 104. As mentioned, the supercomputer 105 may include one or more servers (or the like) in the "cloud", configured to provide calculational services online, and preferably configured to provide priority status to time-critical traffic emergencies. The supercomputer 105 may be configured to calculate a recommended sequence of actions to mitigate the imminent collision, and may transfer the recommended sequence (or additional sequences) to the land-based access point 103. The land-based access point 103 may be configured to transmit a wireless response message 106 to the vehicle 101 including the recommended sequence information.

In some embodiments, the subject vehicle 101 may include an autonomous control system 100 including an on-board processor, an on-board receiver, an on-board transmitter, internal and external sensors, and actuators. The on-board processor may be an electronic digital calculating device or a plurality of such devices, such as a CPU, GPU, ASIC, microcontroller, or other calculating devices suitable for processing sensor data and detecting imminent collisions. The on-board transmitter and on-board receiver may be configured to communicate wirelessly using, for example, 4G or 5G or another high-speed low-latency communication protocol. The sensors may include internal sensors configured to monitor or measure parameters internal to the subject vehicle such as the speed, state of the brakes and steering, and the like. The sensors may further include external sensors configured to measure parameters external to the subject vehicle such as cameras configured to detect other vehicles, radar or lidar or sonar or other distance-measuring sensors, and the like. (The internal and external sensors may be mounted anywhere on or in the subject vehicle, irrespective of the internal-external labels used here.) The actuators may include computer-operable transducers or the like, configured to control the subject vehicle's brakes, steering, throttle (or whatever applies power), and the like. The actuators may also accommodate human inputs when provided by a human driver.

In some embodiments, the wireless request message 102 (or a separate wireless message) may include a request to obtain exclusive use of a data transfer channel, justified by the extreme time-critical emergency. The wireless request message 102 may also include a time period for the exclusivity, based for example on an estimate of the time-to-collision as determined by the on-board processor using the imminent collision data. Alternatively, the exclusivity may be requested just for the initial transfer of the imminent collision data, in which case the exclusivity should be renewed by the supercomputer 105 for the transfer of the recommended sequence to the land-based access point 103.

In some embodiments, the land-based access point 103 may include an antenna suitable for receiving the wireless request message 102. The land-based access point 103 may use the same antenna, or a different antenna, for transmitting the wireless response message 106 to the subject vehicle 101. The land-based access point 103 may include a land-based receiver and a land-based transmitter (or a transceiver) suitable for receiving the wireless request message 102 and transmitting the wireless response message 106. The land-based access point 103 may include other analog and/or digital electronics such as amplifiers, filters, switches and the like, as well as a transponder or the like configured to transfer the imminent collision data to the supercomputer 105 using the data transfer means 104. For example, the land-based access point 103 may be a wireless communication node or base station of a 5G network, another type of cellular network, a dedicated transceiver reserved for collision mitigation, or other suitable interface electronics configured to receive and transmit wireless messages to and from vehicles in motion.

In some embodiments, the land-based access point 103 may be configured to transfer imminent collision data and recommended sequences to and from the supercomputer 105 using a high-speed low-latency communication technology, which may be wireless or cabled or a mixture of the two. For example, the data transfer means 104 may include a cable such as a coaxial electrical cable, a fiber-optic cable, or other device or system for transferring the imminent collision data to the supercomputer 105. In addition, the data transfer means 104 may include one or more wireless links such as 5G transfer links, or elements of a faster communication technology, or microwave beams, or optical communication devices, or other communication technology currently known or discovered in the future. The data transfer means 104 may be duplex (using a single cable or the like to transfer data bidirectionally), or it may include parallel unidirectional beams or cables, or other arrangement suitable for transferring the imminent collision data and the recommended sequence of actions between the land-based access point 103 and the supercomputer 105. If additional electronics or beams or cables or the like are needed to convey data between the land-based access point 103 and the supercomputer 105, such additional elements are collectively included in the transfer means 104.

In some embodiments, the land-based access point 103 may include a local processor configured to analyze traffic data, recognize imminent hazards, select a suitable mitigating sequence, and wirelessly transmit the mitigating sequence to one or more vehicles. For example, the local processor may calculate a mitigating sequence in response to an emergency message from a vehicle, such as the wireless request message 102. The land-based access point 103 may include, or have access to, one or more cameras and/or microphones and/or other sensors configured to monitor traffic. The local processor may detect a hazardous situation based on measurements of vehicle speeds and/or accelerations, or from acoustical information such as the sound of brakes and tires, or other data indicating that a hazard is present or imminent. The local processor may select, from a predetermined set of responses according to the hazard detected, a suitable warning, and may transmit that warning, or an associated sequence of actions, to vehicles in range. The warning may be a simple message such as "hazard in roadway, slow down and prepare to stop!". Depending on the computational power of the local processor, further hazard analysis and sequence selection may be possible, in which case a more specific warning message may be transmitted to vehicles configured to receive it. Vehicles configured to receive such warning messages may include autonomous vehicles having an on-board receiver or human-operated vehicles having an automatic emergency intervention system able to respond to such warnings. As a further example, a human-operated vehicle may be configured to receive warnings from the land-based access point 103 and automatically play those warnings using the vehicle's sound system so that the human driver may respond appropriately to the warning.

In some embodiments, the supercomputer 105 may include one or more computers, one or more supercomputers, a computer cluster, a server, a server "farm", or other calculating device or system suitable for analyzing the imminent collision data and calculating a sequence of actions configured to mitigate the imminent collision. The supercomputer 105 may include multiple computers or supercomputers at different locations, all working on the sequence calculations at the same time (with each computer preferably analyzing different sequences and being coordinated by a central computer or the like). The multiple computers may include a "local" computer or processor associated with the land-based access point 103, and/or a "regional" computer accessible from a larger area such as a state, and/or a "national" computer such as a supercomputer accessible nationwide, or other arrangement of computers. The supercomputer 105 may include software or firmware or the like, configured to analyze the imminent collision data and calculate sequences of actions to mitigate the collision. The supercomputer 105 may include electronics, such as signal processing electronics, configured to extract the imminent collision data from the data transfer means 104, and further electronics configured to send the recommended sequence of actions back along the data transfer means 104. Preferably the supercomputer 105 is powerful enough and fast enough to calculate an effective sequence in a time short compared to the time-to-collision, or at least short enough that the subject vehicle 101 can implement it and thereby mitigate the collision.

In some embodiments, each sequence of actions may specify one or more intervals of acceleration, braking, steering, or waiting, including the intensity and duration of each action. The actions may be sequential, or they may be concurrent such as steering and braking at the same time, or they may be staged or overlapping by various amounts. Such overlapping or concurrent instructions are referred to as "sequences" herein, notwithstanding that some actions may overlap in time. Thus, the definition of "sequential" is to include not just actions separated in time and one after another but also those that are at least partially overlapping in time. To calculate, or discover, or derive the recommended sequence of actions, the supercomputer 105 may consider many alternative sequences, and may calculate the effects of each particular sequence by calculating future trajectories for the various vehicles, including the subject vehicle 101 being accelerated and decelerated according to each sequence in turn. The supercomputer 105 may use a kinetic model or other software to project the positions and speeds of the vehicles forward in time, thereby determining which sequence may avoid the collision. If multiple such sequences are found to avoid the collision, the supercomputer 105 may select a best sequence based on minimizing the amount of acceleration or braking or steering involved, or based on maximizing the probability of success given that the future actions of the other vehicles are not yet known, or other criteria. Alternatively, the supercomputer 105 may be configured to recommend the first avoidance sequence that it finds (that is, the first sequence that is projected to avoid the collision), or the lowest-harm sequence so far discovered (if none are avoidable), so that the subject vehicle 101 can get started on it as soon as possible.

If, on the other hand, none of the sequences (so far calculated) can avoid the collision, then the imminent collision is termed unavoidable, in which case the supercomputer 105 may recommend a "least-harm" sequence. For example, the supercomputer 105 may be configured to calculate a harm value associated with each sequence that results in a collision, and may recommend the particular sequence that is calculated to cause the least amount of harm among all of the sequences so far analyzed. In calculating the harm, the supercomputer may employ a dynamical model of the collision such as a 3-dimensional simulation of vehicle structures being stressed by the collision forces. The harm calculation may determine the peak acceleration and/or the peak jolt ("jolt" equals the rate-of-change of acceleration) experienced by the passengers, and other collision factors affecting the expected number of fatalities, injuries, and property damage caused by the collision. The harm calculation, including the dynamical modeling, may be repeated for each of the sequences.

In some embodiments, the supercomputer 105 may be configured to communicate the best sequence so far obtained to the subject vehicle at a particular time. The supercomputer 105 may continue to calculate further sequences in an ongoing attempt to find a better sequence, up until the projected time-to-collision or other deadline. If a better sequence is found, such as a sequence that converts a previously unavoidable collision into an avoidable one, or a sequence that results in significantly less harm, then the supercomputer 105 may send that improved sequence to the subject vehicle 101, and the subject vehicle 101 may switch to it, if still possible. In addition, the supercomputer 105 may be configured to include the actions that the subject vehicle 101 has already performed while implementing the first-recommended sequence, and thereby make the improved or second-recommended sequence doable by the subject vehicle 101. For example, if the first recommended sequence is to accelerate and turn left, while the improved sequence is to decelerate and turn right, it may be difficult for the subject vehicle 101 to accomplish in a short time.

In some embodiments, the on-board processor of the subject vehicle 101 may analyze its own version of sequences, working in parallel with the supercomputer 105.

Then, after receiving the response message 106 specifying the recommended sequence, the on-board processor can compare the recommended sequence with its own best result, and thereby select the most effective of all the sequences for implementation. In addition, as the scenario evolves and conditions change, the on-board processor may send additional wireless messages to the supercomputer 105 indicating which sequence is being implemented, the actual positions and velocities of the various vehicles, and further relevant data at various times during the implementation period, so that the supercomputer 105 can adjust its continuing sequence exploration using the corrected and updated parameters.

Many imminent collisions have a short time-to-collision such as 1 second or 5 seconds or 10 seconds. If the collision is avoidable, then clearly the subject vehicle should receive the recommended sequence in time to implement it. If the collision is unavoidable, the response time is even more critical since the amount of harm generally increases rapidly with delay. For these reasons and others, it is critical that the imminent collision data be transferred very quickly to the supercomputer 105; it is crucial that the supercomputer 105 be powerful enough to determine an effective sequence in a very short time; and it is crucial that the sequence then be transferred back to the subject vehicle 101 very quickly.

The wireless request and response messages 102-106 must therefore be brief, communicated rapidly, at high bit rate and with minimal latency. In some embodiments, the messages may be encoded for brevity to minimize transmission time, using for example a terse bit-pattern code for expected parameters such as angles, distances, velocities of other vehicles and the like. The wireless request message 102 may demand a dedicated communication channel to avoid being hindered by other lower-priority messages. In some embodiments, the wireless request message 102 can demand an exclusive communication channel extending from the subject vehicle 101 through the land-based access point 103 directly to the supercomputer 105. In that case, other lower-priority activity on the requested channel may be dropped, typically without warning and without hesitation. The exclusivity may be maintained throughout the imminent collision period so that the subject vehicle 101 can update the supercomputer 105 with current parameters at will, and the supercomputer 105 can transfer successively improved sequences back to the subject vehicle 101 unrestricted. However, if the exclusivity request has expired by the time the supercomputer 105 is ready to send the recommended sequence back, the supercomputer 105 may again demand the exclusive and unhindered channel through to the subject vehicle 101.

With advanced communication technology such as 5G and others, latencies as short a 1-10 milliseconds are achievable, and this can be reduced further (less than 1 millisecond) with dedicated electronics to respond to emergencies. The wireless request message 102 may be condensed into a small data package, such as 1 megabyte or less in most cases. Preferably there is no need to send images or other large files. For example, the on-board processor may prepare the imminent collision data to include the locations, bearing, and speed of the other vehicles relative to the subject vehicle, plus an encoded description of the roadway as, for example, single-lane, two-way, divided freeway, and the like. 5G technology can have a transfer rate of 1-10 gigabits per second (sometimes higher); hence the 1 megabyte wireless request message 102 (totaling about 10 megabits including parity, start and stop icons, and other necessary attachments) may be transferred in 1-2 milliseconds after latency.

The wireless response message 106 is likely much smaller than the imminent collision data in most cases, but will be assumed here to take an additional 1-2 milliseconds. Additional few milliseconds may be needed for readiness verification and other hand-shaking.

To achieve the necessary speed and computing power, in some embodiments, the supercomputer 105 may include a large number of processing units (or "cores") operating in parallel, such as 10,000 or 100,000 or 1,000,000 cores or more. Each core may be driven at a high clock speed such as 4 or 5 GHz or even more in a brief "burst" mode. The computational capability may be measured in "flops" (floating-point operations per second), or more conveniently in "petaflops" (1 petaflop equals 1 thousand million million or one quadrillion or $10^{15}$ floating-point operations per second). For example, the supercomputer 105 may have a capability of 0.1 or 10 or 100 petaflops or more. To consider a specific scenario, the supercomputer 105 may require a large number of floating-point operations, such as 10 million floating point operations, to analyze each sequence. This many floating-point operations may be needed to project the vehicle motions forward in time, perform collision analysis including dynamical modeling of the effects of collision, and calculating the harm for example. Furthermore, in searching for an effective sequence to mitigate a complex collision scenario, the supercomputer 105 may need to calculate a large number, such as 10 million, different sequences before selecting one to recommended for the collision scenario at hand. With those numbers, then, the total number of floating-point operations required for the response equals $10^{14}$ operations. A computer with a 1-petaflop computational capability can do this in 100 milliseconds (0.1 second).

The total response time is then found by adding the expected latencies, message transfer rates, possible hand-shaking, and computation interval. With the assumptions listed above, the time required from the initial wireless help request message 102 to the supercomputer beginning its search, is likely well below 50 milliseconds, the search time is 100 milliseconds as mentioned, and the time to get the recommended sequence back to the subject vehicle 101 is less than 50 milliseconds, or 200 milliseconds in all (0.2 seconds). Mitigating a more complex collision scenario involving several vehicles and environmental objects may take longer, perhaps 0.5 seconds. For comparison, most human drivers require at least 0.7-1.2 seconds to execute a panic reflex action such as simply hitting the brakes. The collision-mitigation system with supercomputer assistance may thus provide a better sequence of actions than any human could figure out in the available time, and faster than any human could react, and begin implementing it automatically before a human driver could even hit the brakes. The system may thereby avoid many unnecessary collisions and save countless lives.

Figure 2A:
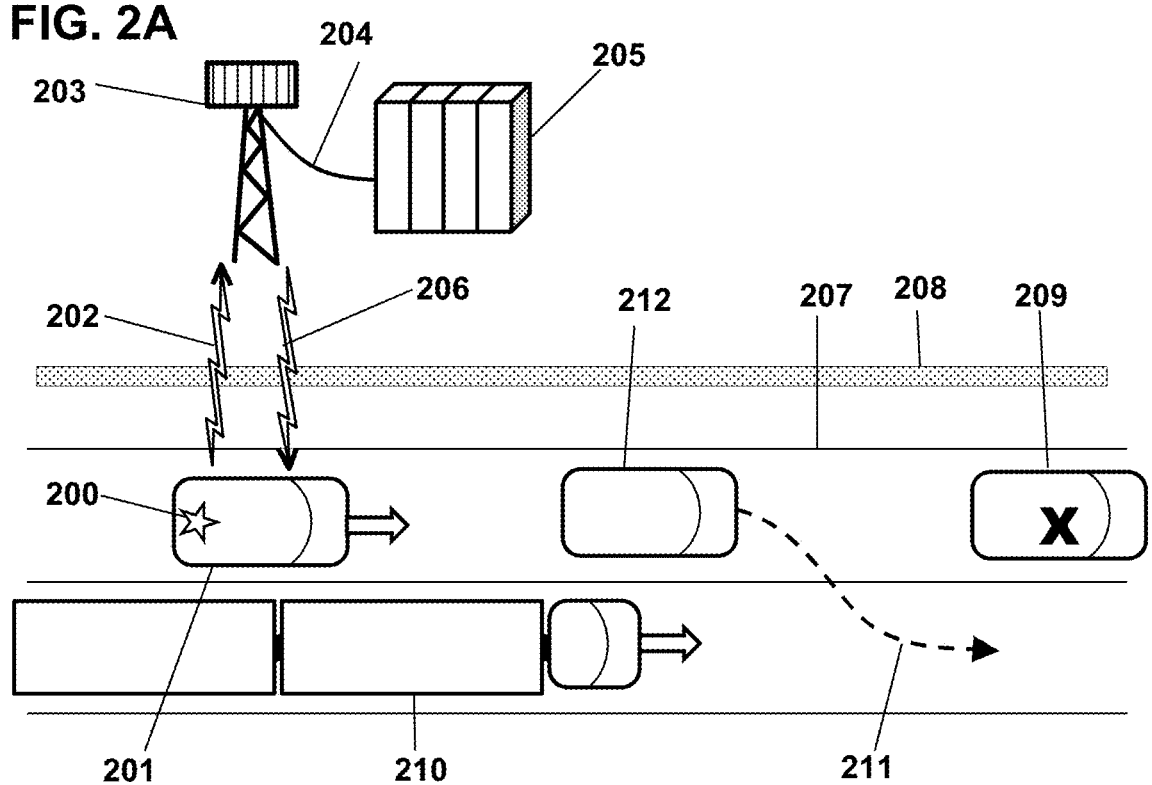
FIG. 2A is a sketch showing an imminent collision including a vehicle with an exemplary collision mitigation system, according to some embodiments.

FIG. 2A is a notional sketch of a collision scenario including an exemplary system for mitigating collisions. A subject vehicle 201 is traveling in a multilane divided highway. Lane lines 207 demark two lanes going in the same direction, separated from the opposite lanes (not shown) by a concrete barrier 208. A stalled vehicle 209 (marked by an X) has stopped in lanes, but the subject vehicle's autonomous computer or driver is unaware of the hazard because the view is obscured by an intervening vehicle 212. The intervening vehicle 212 quickly changes lanes as indicated by a dashed arrow 211, which suddenly reveals the stalled vehicle 209. This kind of "sudden-reveal" is a common and very dangerous situation because it leaves insufficient time for the approaching vehicles to react. In this case, the subject vehicle 201 is going too fast to stop before hitting the stalled vehicle 202. The on-board processor calculates that the subject vehicle 201 will collide with the stalled vehicle 209 at a dangerously high speed even if the brakes are applied immediately and maximally. The collision will subject the occupants of both vehicles to high peak accelerations and peak jolt, sufficient to cause serious injury or death. Unfortunately, the subject vehicle 201 cannot change lanes because a long truck 210 is in the way. The subject vehicle 101 cannot swerve around the stalled vehicle 209 on the left because there is not enough space between the concrete divider 208 and the stalled vehicle 209. In this situation, most human drivers (and most prior-art autonomous systems) would simply lock the brakes and hang on.

Fortunately, the subject vehicle 201 includes an on-board system 200 including an on-board processor, and on-board transceiver, sensors, and actuators such as described in FIG. 1, and also is in range of a land-based wireless access point 203. The subject vehicle 201 therefore transmits a wireless request message 202, which includes a request for computational assistance along with the imminent collision data. Although the on-board processor neglected to demand an exclusive communication channel, the land-based access point 203 is configured to terminate competing messages in an emergency, and thereby transfers the imminent collision data to a supercomputer 205 via a fast uncontested communication channel 204. The supercomputer 205 then analyzes the imminent collision data, calculates a large number of mitigation sequences, and determines that none of them can avoid the collision, hence the collision is unavoidable. The supercomputer 205 then (if not sooner) calculates the harm expected in each of the sequences (or in a subset of the sequences, selected for feasibility or other quality), and selects the sequence that causes the least harm, and sends the recommended sequence to the land-based access point 203 which relays the recommended sequence to the subject vehicle 201 in the form of a wireless response message 206. The action continues in FIG. 2B.

Figure 2B:
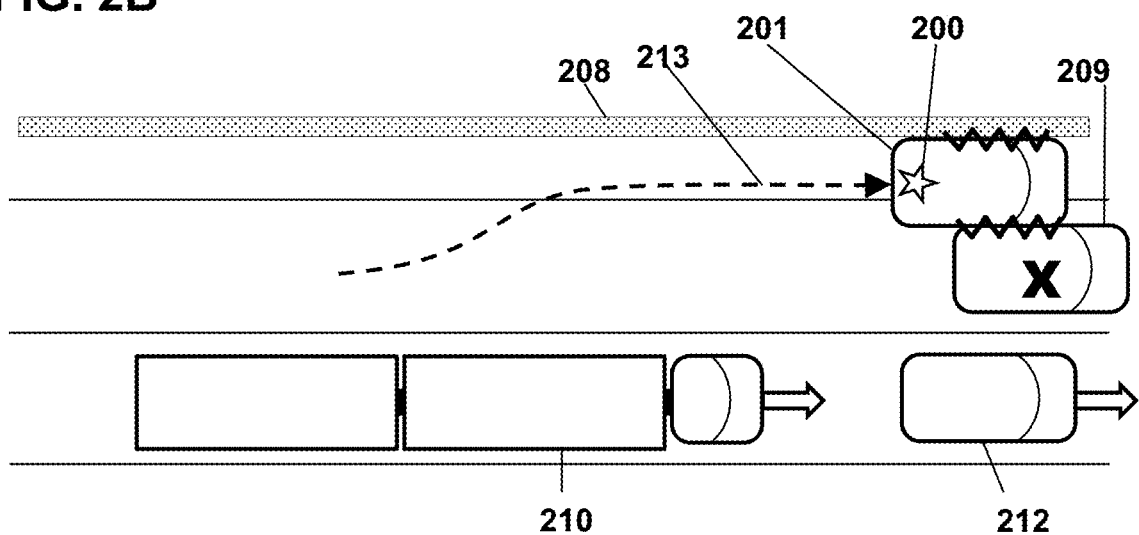
FIG. 2B is a sketch of the scenario of FIG. 2A, showing an exemplary mitigation, according to some embodiments.

FIG. 2B shows the same scene as FIG. 2A but 2-3 seconds later. The recommended sequence, being implemented by the subject vehicle 201, has caused the on-board system 200 of the subject vehicle 201 to reduce the braking pressure briefly in order to enable maneuvering without skidding, and simultaneously to swerve left even though there is not enough room. The subject vehicle 101 is then instructed to slide against the concrete barrier 208 while now braking as hard as possible, in order to dissipate some of its kinetic energy, and to aim for the small space between the second vehicle 202 and the concrete barrier 208. The subject vehicle 201 thereby follows the trajectory indicated as 213, losing energy rapidly while braking and grinding along the concrete barrier 208. The subject vehicle 201 then collides tangentially along the side of the stalled vehicle 208, continuing to plow forward through the collision until finally stopping. Jagged lines indicate the damage zones, which are extensive. Both of the vehicles 201-208 are totaled, of course, but they would have been anyway. The important thing is that the occupants survived with minimal harm since the collision process was rendered relatively gradual by the manner in which the kinetic energy was dissipated during an extended time period, along the widely distributed crumple zones, thereby avoiding peak accelerations even during the collision process, and especially minimizing the peak jolt experienced by the occupants. The supercomputer 205 thus found a sequence of actions that minimized the harm, in what would otherwise have been a much more serious collision.

Figure 2C:
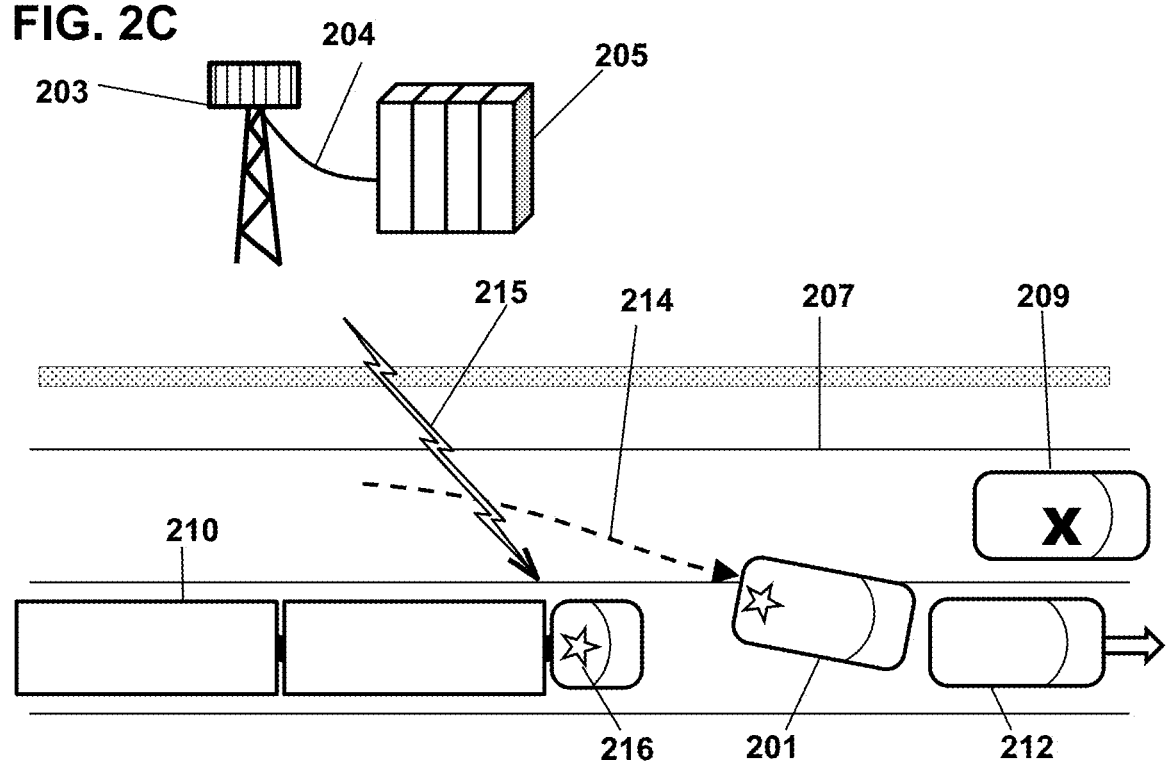
FIG. 2C is a sketch of the scenario of FIG. 2A, showing a different mitigation strategy, according to some embodiments.

FIG. 2C shows a different mitigation of the imminent collision of FIG. 2A, with even better results. Here the truck 210 is assumed to be autonomous or semi-autonomous with an emergency intervention system 216. The emergency intervention system 216 includes a transceiver and a processor configured to control the brakes and other items of the truck 210. The land-based access point 203 is thus able to communicate with the truck 210 via the emergency intervention system 216. The supercomputer 205, after receiving the wireless request message 202 from the subject vehicle 201, may send a wireless command message 215 to the truck 210, instructing it to immediately begin braking as hard as possible. The truck 210 did so, and thereby opened up sufficient space to allow the subject vehicle 201 to squeeze in (214) behind the intervening vehicle 212, thereby avoiding the collision entirely. The key to this solution is the ability of the supercomputer 205 to communicate directly and near-instantaneously with the truck 210, and the ability of the truck 210 to respond near-instantaneously to emergency commands.

Figure 2D:
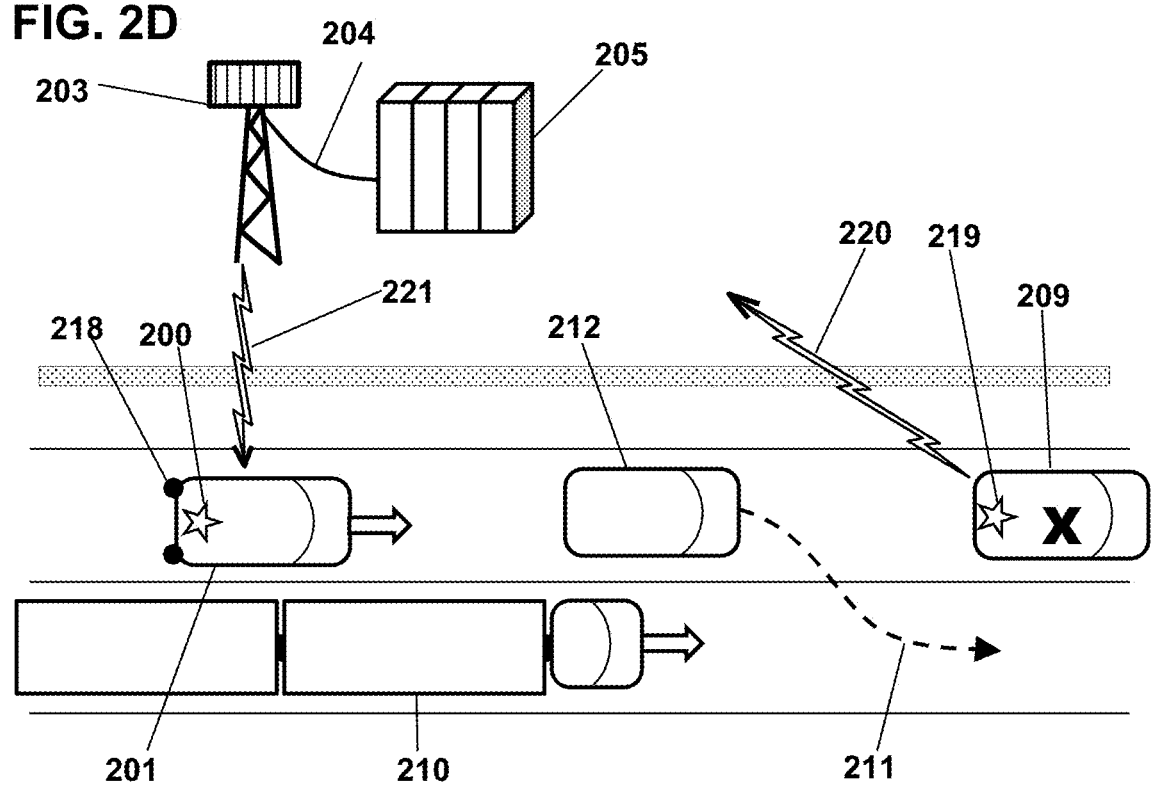
FIG. 2D is a sketch of the scenario of FIG. 2A, showing how an exemplary local access point can prevent a collision, according to some embodiments.

FIG. 2D shows yet another mitigation option. Here the stalled vehicle 209 includes an on-board system 219 as described with FIG. 1, which is able to communicate wirelessly with the land-based access point 103. Thus the stalled vehicle system 219 sends an emergency alert wireless message 220 to the land-based access point 203, informing that the vehicle is stalled in traffic lanes. The local access point 203, or its included local processor, then sent a broadcast warning to inform oncoming traffic, and particularly sent a warning message 221 to the subject vehicle 201 instructing it to slow down and be prepared to stop. In response, the on-board system 200 of the subject vehicle 201 began decelerating as indicated by the brake lights 218 as soon as it received the warning message 221, which was substantially before the intervening vehicle 212 started its move 211. Then, when the stalled vehicle 209 was subsequently revealed to the subject vehicle 201, the subject vehicle 201 had decelerated sufficiently that it was able to stop before hitting the stalled vehicle 209, thereby avoiding the collision. Any additional vehicles approaching in the same lane may also have time to stop, by seeing the brake lights 218 or by receiving the warning message 221 for example. In this case, the local access point 203 provided the mitigation without assistance from the supercomputer 205, since extensive computation was not necessary. In a more complicated situation, or in the scenario depicted but without the warning message 221, the land-based access point 203 may have transferred the traffic data to the supercomputer 205 for additional computational backup, but may still have transmitted the warning message 221 as soon as it received the wireless request message 202, so that other vehicles in the area may be warned that a hazard was developing. In this way, the land-based access point 203 may operate both independently of the supercomputer 205 and cooperatively with the supercomputer 205, to find and communicate the best solutions to traffic hazards in real-time.

FIG. 3 is a flowchart showing an exemplary method for mitigating collisions with supercomputer assistance. Actions of the subject vehicle are shown on the left, and actions of the "remote" supercomputer are shown on the right. In this example, the supercomputer is assumed to be located a substantial distance (such as hundreds or thousands of kilometers) from the land-based access point, and to be capable of very high computational power. Other versions are described below.

At 301, the subject vehicle scans traffic and detects an imminent collision. It quickly contacts 302 the nearest land-based access point, demanding an unshared emergency-priority data channel to a supercomputer, and then transmits the imminent collision data 303 wirelessly. The land-based access point (in cooperation with other downstream electronics) abruptly terminates any competing messages and opens a dedicated, straight-through communication channel to the supercomputer, and transfers the imminent collision data to the supercomputer at 304. The supercomputer analyzes 305 the data, calculates collision scenarios according to various sequences of actions, determines whether the collision is avoidable, and calculates an avoidance sequence if the collision is avoidable or a harm-minimization sequence if unavoidable. The supercomputer then routes 306 the recommended sequence back to the land-based access point which wirelessly transmits it to the subject vehicle. In the meantime, the on-board processor calculates 307 as many sequences as it can in the short interval. In this way, the on-board processor prepares a "fallback" plan which it can use in case the communication link to the supercomputer fails, or the supercomputer is busy with another collision emergency, or some other problem arises. In this way, the subject vehicle is not dependent on the supercomputer, and uses its own resources to find as good a sequence as possible, simultaneously and independently of the supercomputer.

Optionally (shown in dash) the subject vehicle may begin 308 implementing the best sequence that it has found on-board, even before hearing from the supercomputer. The on-board processor, although not as powerful as the supercomputer, can at least do something to mitigate the collision, and therefore may decide to get started before receiving the recommended sequence. As a further option (not shown) the subject vehicle can send a message to the supercomputer informing it that the subject vehicle has started implementing its own action sequence, so that the supercomputer can take into consideration the updated motion, including position and acceleration, while calculating further mitigation sequences.

At 309, the on-board processor has received the response message from the supercomputer. The on-board processor compares its own best sequence with that recommended by the supercomputer, selects the best of all, and proceeds to implement the best sequence.

As a further option 310-312, the subject vehicle and/or the supercomputer and/or the land-based access point can send a message to local authorities alerting them that a crash is imminent at a particular location, and other data. In addition, the on-board processor and/or the supercomputer may continue to calculate sequences 311-313 even after the recommended sequence has been transmitted and put into action. The calculations may continue until the collision occurs or is finally avoided, the intent being to find an even better sequence that can be implemented in time. In many collision scenarios, an opportunity may appear at the last second in which the severity can be reduced by the right motion, which may not be predictable in advance. Therefore, the on-board processor may update the supercomputer throughout this time and may listen for any last-second advice from the supercomputer. The exclusive communication link may be released as soon as the collision is completed or is avoided. Alternatively, the exclusive channel may be maintained longer, if there is reason to continue using the supercomputer's services, for example to avoid a secondary threat from oncoming traffic.

The example calls upon a remote computer to calculate a mitigating sequence. As an alternative, the local processor at the land-based access point may be able to do it. For example, at 304 (highlighted box), the imminent collision data may be retained at the land-based access point and processed by the local processor, instead of being sent to a remote computer. The choice of whether to analyze the data locally or with the remote computer may depend on the complexity of the imminent collision, the amount of time available before the collision, the local processing power, and other factors. In a collision scenario that has an easily discerned action that will avoid the collision with high probability, the local processor may transmit that sequence to the subject vehicle without involving the remote computer. As a further alternative, all three entities—the on-board processor, the local processor at the land-based access point, and the remote supercomputer—may be tasked with calculations simultaneously. If all three entities provide different sequences, the on-board processor is preferably the one to decide which sequence has the best chance of avoiding the collision.

FIG. 4 is a schematic showing an exemplary time series of operations related to the mitigation of an imminent collision, with assistance from a supercomputer. Three horizontal lines show actions related to a subject vehicle, a land-based access point, and a supercomputer, respectively, at different locations. Time is the horizontal axis. Actions are indicated by boxes. Information transfers between locations are indicated by heavy arrows.

Initially, the subject vehicle scans traffic using its sensors and determines that a collision is imminent. The subject vehicle then sends a wireless signal demanding an uncontested communication channel on an emergency basis. The land-based access point responds by abruptly terminating any low-priority messages ("chatter" shown by cross-hatch) and establishes an interference-free communication channel for the subject vehicle, then sends a wireless message acknowledging the demand back to the subject vehicle. The subject vehicle then sends a second wireless message containing the imminent collision data, such as the positions and velocities of the other vehicles relative to the subject vehicle, and also the conditions of the roadway, and other relevant information. The land-based access point receives the imminent collision data and relays the data to the supercomputer. The supercomputer then calculates sequences of actions, typically a very large number of sequences of actions, to determine if any of them can avoid the collision, and if not, which sequence provides the least harm. The supercomputer thereby selects a particular sequence to recommend and sends the recommended sequence back to the land-based access point, which relays the sequence to the subject vehicle as a wireless response message. The subject vehicle receives the recommended sequence and implements it by activating the brakes, steering, and throttle according to the recommended sequence, thereby mitigating the collision.

The depicted scenario affords many optional variations, some of which are shown in dash. (a) The subject vehicle may insert the imminent collision data into the initial wireless signal which also demands clear access, rather than waiting for the acknowledgement, thereby saving a little time. (b) The on-board processor may calculate its own sequences of actions (shown in light stipple) after sending the imminent collision data. (c) The on-board processor may also select one of the on-board sequences and begin implementing it (diamond hatch) before receiving anything back from the supercomputer. Calculating the on-board sequence and beginning to implement it may be advantageous if there were a communication interruption or other delay preventing the supercomputer from helping the subject vehicle. The subject vehicle may thus remain self-sufficient and not dependent on remote assistance which may not arrive for various reasons. In this case, the recommended sequence does arrive, at which time the on-board processor can decide (d) whether to switch to the recommended sequence or continue implementing the on-board sequence already started. If the recommended sequence is able to avoid the collision whereas the on-board sequence is only able to minimize the harm, then of course the on-board processor will switch to the recommended sequence, assuming there is still time to implement the avoidance sequence. Likewise if the recommended sequence promises less harm then the on-board sequence, then again the on-board processor may switch to it. However, if the on-board sequence is better than the recommended sequence, or if there is simply not enough time to implement the recommended sequence, then the on-board processor may decide to continue implementing the sequence already in progress.

As a further option, (e) the local processor of the land-based access point may perform its own calculations after transferring the imminent collision data to the supercomputer (or concurrently), thereby potentially finding yet another sequence (a "local" sequence) for consideration. The land-based access point can transmit its local sequence to the subject vehicle as soon as a suitable sequence is discovered, or alternatively the land-based access point may transmit the local sequence along with the recommended sequence of the supercomputer in a single wireless response message, or otherwise. If the recommended sequence is clearly superior (such as avoiding the collision while the local sequence does not), then the land-based access point may withhold its local sequence, to save time and avoid confusion. In this way all three entities—on-board processor, local processor, and remote supercomputer—work together to help the subject vehicle mitigate the imminent collision.

As a further option (f) the supercomputer and/or the on-board processor and/or the local processor may continue to explore further sequences even after the recommended sequence has been delivered, in the hope of finding an even better outcome in time to carry it out. Especially as the time-to-collision approaches, a last-second adjustment in steering for example may make a significant difference in the amount of harm if implemented in time. Also, the on-board processor, the local processor, and the supercomputer may communicate repeatedly during the sequence search process, and thereafter, to update each other according to the actual trajectories of the vehicles involved and any other unexpected events that may relate to the mitigation.

As a further option (not shown), the land-based access point may allow low-priority messages to resume after relaying the imminent collision data to the land-based computer, and likewise may resume low-priority messages after relaying the recommended sequence to the subject vehicle, or at other times. However, if it does so, preferably the land-based access point is prepared to interrupt those messages abruptly whenever the on-board processor or the supercomputer initiates a communication.

The various messages and actions in the chart are shown occupying separate (non-overlapping) time intervals, but in a practical system many of these actions may be performed concurrently in order to save time. For example, the land-based access point (acting as a bitwise relay) may begin transferring the imminent collision data to the supercomputer while still receiving the wireless request message (or whichever wireless message includes the imminent collision data). Likewise the land-based access point may relay the recommended sequence to the subject vehicle while the sequence is still being transferred from the supercomputer, since they likely involve separate electronics and can be configured to operate at the same time. In addition, the on-board processor may begin implementing the recommended sequence even while the wireless response message is in progress, for example by implementing the first action in the sequence, thereby saving precious milliseconds. In an imminent collision scenario, milliseconds save lives.

Also not shown are steps and options for the supercomputer and/or the on-board processor and/or the local processor to calculate sequences based on a catalog of previously-successful sequences. In some cases it may save time to start with sequences that have been used previously in closely-related collision scenarios, and then varying parameters of those previously-successful sequences to adapt them to the present emergency. If none of the previously-successful sequences is satisfactory, then the processor may proceed to invent new sequences. The catalog of previously-successful sequences, and the conditions under which they have been suitable, may be stored within or proximate to each of those processors as non-volatile data, accessible and readable by the respective processors when needed.

As a further option, the supercomputer (or other remote computer, or nonspecific data storage maintained in the "cloud") may contain the catalog of previously-successful sequences, as well as the conditions under which those sequences may be suitable. Then, any of the above processors (that is, the on-board processor, the local processor at the land-based access point, or the remote supercomputer or other computer assisting in collision mitigation) can retrieve the relevant previously-successful sequences, and can adapt them to the emergency at hand.

As a further option, the supercomputer may draw upon other computers, such as other supercomputers in a regional or nationwide grid (or a global grid if connected by speed-of-light communication) or in the "cloud" of networked processors. The supercomputer may thereby obtain further computational power, data backup, software redundancy, etc.

The collision-mitigation systems and methods disclosed herein can provide numerous benefits not available heretofore. Embodiments can employ the superior calculational power of a local computer, a remote computer cluster, a national supercomputer, or the like to select a beneficial sequence of actions in a traffic emergency. The supercomputer (or the like) typically has many thousands of times greater computing power than the subject vehicle, and therefore is able to explore a much wider range of sequences with higher precision. The supercomputer may also be able to perform the difficult dynamical modeling calculations, that relate the impact parameters to the harm estimates, in the limited time available. Dynamical collision modeling may be needed to determine which sequence minimizes the harm, depending on just how the vehicles come together. Teamed with fast communication protocols and fast wireless access points, the supercomputer can thus assist the subject vehicle in avoiding, or at least minimizing, imminent collisions.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where robot controls are contemplated, the plural inputs may allow plural users to input relevant data at the same time.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for an autonomous vehicle to mitigate an imminent collision, the method comprising:
   a) determining that a collision with a second vehicle is imminent;
   b) transmitting, to an access point, a request message requesting assistance in mitigating the imminent collision;
   c) calculating, using a processor in the autonomous vehicle, a first plurality of sequences of actions, and determining whether each of the sequences of actions of the first plurality can avoid the imminent collision;
   d) upon determining that a particular sequence of actions of the first plurality can avoid the imminent collision, implementing the particular sequence of actions; and
   e) while none of the sequences of actions of the first plurality can avoid the imminent collision, selecting a selected sequence of actions of the first plurality that can produce a least amount of harm, and implementing the selected sequence of actions.

2. The method of claim 1, wherein the request message is transmitted according to 5G or 6G technology.

3. The method of claim 1, further comprising:
   a) receiving a suggestion message from the access point, the suggestion message comprising a second plurality of sequences of actions;
   b) when none of the sequences of actions of the first plurality can avoid the imminent collision, then:
      i) determining whether any of the sequences of actions of the second plurality can avoid the imminent collision; and
      ii) implementing a sequence of actions of the second plurality that can avoid the imminent collision; and
      iii) upon determining that none of the sequences of actions of the second plurality can avoid the imminent collision, implementing a sequence of actions, of either the first plurality or the second plurality, that can produce the least amount of harm.

4. The method of claim 1, wherein the harm comprises an estimated number of fatalities, an estimated number of injuries, and an estimated amount of property damage, caused by the imminent collision.

5. The method of claim 1, wherein the harm comprises an estimated number of fatalities times a predetermined fatality factor, plus an estimated number of injuries times a predetermined injury factor, plus an estimated amount of property damage times a property damage factor, caused by the imminent collision.

6. The method of claim 1, further comprising:
   a) receiving an additional suggestion message comprising at least one additional sequence of actions;
   b) when a currently implemented sequence of actions cannot avoid the imminent collision, determining whether the at least one additional sequence of actions can avoid the collision, and if so, implementing whichever additional sequence of actions can avoid the collision; and
   c) when a currently implemented sequence of actions cannot avoid the imminent collision, and none of the at least one additional sequence of actions can avoid the imminent collision, determining whether one of the additional sequence of actions can produce less harm than the currently implemented sequence of actions, and if so, implementing the one of the additional sequence of actions that can produce less harm than the currently implemented sequence of actions.

7. The method of claim 1, wherein each sequence of actions, of the first or second pluralities, comprises sequential actions, each of the sequential actions comprising a positive acceleration, a braking, or a steering action, for a predetermined interval at a predetermined strength or intensity.

8. A method for an access point to enable an autonomous vehicle to mitigate an imminent collision, the method comprising:
   a) receiving a request message from an autonomous vehicle, the request message requesting assistance in mitigating an imminent collision;
   b) receiving, in or with the request message, or in a subsequent message, data about the imminent collision;
   c) transmitting, to a supercomputer, the data about the imminent collision;
   d) calculating, using a processor in the access point or associated with the access point, a first plurality of sequences of actions; and
   e) determining, according to the data about the imminent collision, whether any of the sequences of actions of the first plurality can avoid the imminent collision, and if so, selecting, as a selected sequence of actions, the sequence of actions of the first plurality that can avoid the imminent collision.

9. The method of claim 8, further comprising:
   a) upon determining that none of the first plurality of sequences of actions can avoid the imminent collision, determining an estimated level of harm caused by the imminent collision according to each of the sequences of actions of the first plurality, and selecting, as the selected sequence of actions, the sequence of actions of the first plurality that is expected to cause a least amount of harm.

10. The method of claim 9, further comprising:
    a) transmitting a suggestion message to the autonomous vehicle indicating the selected sequence of actions, and further indicating whether the selected sequence of actions can avoid the imminent collision.

11. The method of claim 8, further comprising:
    a) receiving, from the supercomputer, at least one additional sequence of actions; and
    b) transmitting, to the autonomous vehicle, an additional message indicating the at least one additional sequence of actions.

12. The method of claim 11, further comprising:
    a) continuing to calculate further sequences of actions and determining whether each of the further sequences of actions can avoid the imminent collision, and if not, calculating an expected harm of each of the further sequences of actions.

13. The method of claim 12, further comprising:
    a) upon determining that a particular sequence of actions, of the further sequences of actions, can avoid the collision, transmitting the particular sequence of actions to the autonomous vehicle.

14. The method of claim 8, responsive to receiving the request message, broadcasting an exclusion message requesting that vehicles not experiencing an emergency should cease transmitting for an indicated period of time.

15. A method for a supercomputer to enable an autonomous vehicle to mitigate an imminent collision, the method comprising:
    a) using an artificial intelligence structure comprising a processor and a memory containing an artificial intelligence model;

b) receiving, from an access point, data about an imminent collision involving an autonomous vehicle;
c) providing, as input to the artificial intelligence model, the data about the imminent collision;
d) determining, as output from the artificial intelligence model, zero or more sequences of actions that can enable the autonomous vehicle to avoid the imminent collision;
e) when at least one of the sequences of actions can enable the autonomous vehicle to avoid the imminent collision, selecting one of the at least one sequences of actions;
f) when none of the sequences of actions can enable the autonomous vehicle to avoid the imminent collision, selecting a sequence of actions that is expected to cause a least amount of harm; and
g) transmitting, to the access point, the selected sequence of actions.

16. The method of claim 15, further comprising transmitting, to the access point, one of:
a) an indication that the sequence of actions can enable the autonomous vehicle to avoid the imminent collision; or
b) an indication of how much harm is expected to be caused by the sequence of actions.

17. The method of claim 15, further comprising:
a) after transmitting the selected sequence of actions, continuing to calculate further sequences of actions;
b) determining whether the further sequences of actions can enable the autonomous vehicle to avoid the imminent collision; and
c) when the further sequences of actions cannot enable the autonomous vehicle to avoid the imminent collision, calculating an amount of harm expected to be caused by the further sequence of actions.

18. The method of claim 15, wherein the harm comprises an expected number of fatalities, an expected number of injuries, and an expected amount of property damage.

19. The method of claim 15, wherein the harm comprises an expected number of fatalities times a fatality factor, plus an expected number of injuries times an injury factor, plus an expected amount of property damage times a property damage factor.

20. The method of claim 15, further comprising:
a) calculating a time of the imminent collision; and
b) upon reaching the time of the imminent collision, ceasing to calculate further sequences of actions.

* * * * *